United States Patent
Balakrishnan

(10) Patent No.: US 9,690,798 B2
(45) Date of Patent: *Jun. 27, 2017

(54) SYSTEM AND METHOD FOR ORGANIZING FILES BASED ON A UNIQUE IDENTIFICATION CODE

(71) Applicant: Dropbox, Inc., San Francisco, CA (US)

(72) Inventor: Ramesh Balakrishnan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,577

(22) Filed: Nov. 23, 2015

(65) Prior Publication Data

US 2016/0078048 A1 Mar. 17, 2016

Related U.S. Application Data

(63) Continuation of application No. 13/725,575, filed on Dec. 21, 2012, now Pat. No. 9,218,368.

(51) Int. Cl.
*G06F 17/30* (2006.01)

(52) U.S. Cl.
CPC .. *G06F 17/30123* (2013.01); *G06F 17/30265* (2013.01)

(58) Field of Classification Search
USPC ........................................ 707/695, 806, 822
See application file for complete search history.

(56) References Cited

U.S. PATENT DOCUMENTS

| | | | |
|---|---|---|---|
| 5,572,729 A * | 11/1996 | Giordano | G06F 17/3012 |
| 5,928,306 A | 7/1999 | France et al. | |
| 7,987,166 B2 | 7/2011 | McKenney et al. | |
| 2003/0200229 A1* | 10/2003 | Cazier | G06F 17/3028 |
| 2004/0002942 A1 | 1/2004 | Pudipeddi et al. | |
| 2006/0020578 A1 | 1/2006 | Hood | |
| 2006/0059212 A1 | 3/2006 | Carro | |
| 2006/0123020 A1 | 6/2006 | Bybee et al. | |
| 2006/0259516 A1 | 11/2006 | Stakutis et al. | |
| 2007/0049250 A1 | 3/2007 | Chambers et al. | |
| 2007/0244877 A1 | 10/2007 | Kempka | |
| 2009/0327729 A1 | 12/2009 | Rhodes et al. | |
| 2010/0312810 A1 | 12/2010 | Horton et al. | |
| 2011/0213700 A1 | 9/2011 | Sant'Anselmo | |
| 2011/0214072 A1 | 9/2011 | Lindemann et al. | |
| 2012/0176504 A1 | 7/2012 | Lee et al. | |
| 2013/0218854 A1 | 8/2013 | Mungi | |
| 2014/0122479 A1 | 5/2014 | Panferov | |

* cited by examiner

*Primary Examiner* — Cam-Linh Nguyen
(74) *Attorney, Agent, or Firm* — Polsinelli PC

(57) ABSTRACT

A system for determining a time that a file was created and associating an ID with the file based on the file creation time is disclosed. The system adjusts the creation time by a time zone offset. In the case of image files, the file creation time may be based on information associated with the image: (1) by the camera that took the picture (exchangeable image file data); (2) when the photo was last modified in memory (file modification time data); (3) based on the raw date and time the photo file was created (file date-time data); and (4) when the photo was imported onto a client device. The system may rename the file with this adjusted creation time to create a standardized name. As a result, the standardized name provides a filename nomenclature that is based on the actual or estimated time of when the file was created.

20 Claims, 3 Drawing Sheets

SYSTEM AND METHOD FOR ORGANIZING FILES BASED ON A UNIQUE IDENTIFICATION CODE

CROSS REFERENCE TO RELATED APPLICATIONS

This application is a continuation of U.S. patent application Ser. No. 13/725,575, filed Dec. 21, 2012, now U.S. Pat. No. 9,218,368, which is incorporated herein by reference in its entirety and for all purposes.

BACKGROUND

Traditionally, files in a computer system are organized by file name or by the date and time associated with the files. File organization by name is sufficient when there is a single user on a single device—the single user can control the file names and the file creation times are based on a single device's internal clock. However, with the advent of online, internet-based, social expression and personal publishing services, users may upload content (e.g., files) from different devices to a central storage location associated with an account. Additionally, some services enable cross-platform content synchronization and sharing (e.g., the Dropbox™ service), which enables users to conveniently upload, store, and view files on any device associated with the account. Moreover, the trend is to enable users to share uploaded files with other users. Users may be able to share certain files or entire accounts by associating other users with the same account. Users in a cross-platform synchronized content management system may modify or upload files in different time zones and with different devices. This adds many levels of complexity to file organization. For example, each user or device may use a different default naming convention for the same type of file. Different devices may be located in different time zones, giving each file a date and time that is not standardized (i.e., Nov. 15, 2012 10:47 in California is not the same as Nov. 15, 2012 10:47 in Germany). Therefore, organizing files in a meaningful way for all users may be difficult.

In a specific example, digital photo-technology has matured to the point where miniature cameras may be incorporated into almost any mobile device. Consequently, today's consumer commonly has more than one device with which to capture photos. Specifically, a consumer may have a digital camera, a cell phone, an iPad®, a laptop, and an iPod®. Thus, consumers may capture images on various devices, and in some cases, may capture the same or similar photos on more than one device.

When consumers upload photos from a plurality of devices to either a desktop computer or a cloud-based storage system, the computer or system typically orders the photos by the file name assigned by the device. This may be problematic since different devices use different naming nomenclature. Thus, files uploaded from one device may have names that significantly differ from those uploaded from another device. As an example, an iPhone® may label each image with the prefix "IMG-", while a digital camera manufactured by Canon, Inc. may label each image with the prefix "DSC." In the above example, images taken at the same event by different devices may be ordered alphabetically, but not sequentially due to differences in the file naming nomenclature. Consequently, photos uploaded from various devices to the same system may not be arranged and displayed in a meaningful way, such as in chronological order based on the file name. Furthermore, if one device uses the same naming nomenclature as another device, then the consumer may end up with two different photos having the same name. As a result, photos having the same name may cause a first uploaded file to be overwritten by a second uploaded file having the same name.

The present disclosure recognizes and addresses the foregoing considerations, and others, of prior art system and methods.

SUMMARY

The present disclosure discusses a computer-implemented method, in various embodiments, for creating and associating a unique identification code ("ID") with files. This ID may be used, for example, to chronologically order files. Associating uploaded files from a client device to a content management server with an ID may include: (1) receiving, from the client device, at least one file and data associated with the at least one file; (2) determining a creation time for the at least one file based on the data associated with the at least one file; and (3) associating the at least one file with a unique identification code that is based on the creation time of the file.

In some embodiments, determining the creation time may include adjusting the creation time to account for a time zone. In other embodiments, the data associated with a file may include one or more of: (1) exchangeable image file data that includes a date and a time that an image was captured, in the case of image files; (2) a file modification time that indicates a date and a time that a file was stored in memory of the device that created the file; (3) a file date-time that indicates a raw date and a raw time that the at least one file was created; (4) a file import time that indicates when the at least one file was imported to the client device; (5) metadata that includes a date and time; (6) extendable file data that includes a date and time; and (6) any other data associated with the file that may include date and time data information.

Although any file can be associated with an ID, various embodiments in the present disclosure focus on image files. Additionally, for image files, a system may rename the file based on the ID. A system for associating uploaded files with an ID may include: (1) at least one processor; (2) memory operatively coupled to the processor; and (3) a network connection operatively coupled to the processor. In various embodiments, the content management server is linked to a client device. Here, the at least one processor may be configured to receive, from the client device over the at least one network, a plurality of image files and data associated with each of the image files. The received data may include: (a) a file import time that indicates when each of the image files imported onto the client device; (b) a file name for each of the image files; and (c) one or more of the following: (i) exchangeable image file data that may include a date and a time that each of the image files was captured; (ii) a file modification time that indicates a date and a time that each of the image files was stored in memory of the device that captured the image, expressed in hours, minutes, seconds and milliseconds; and (iii) a file date-time that indicates a raw date and a raw time that each of the image files was created by the device that capture the image, expressed in hours, minutes and seconds. Additionally, the processor may be configured to determine a creation (e.g., capture) time for each of the image files based on the data associated with each of the image files and adjust the creation time based on a time zone associated with the image file. Finally, the processor may rename each of the image files with a standardized name that is based on the adjusted capture time.

BRIEF DESCRIPTION OF THE DRAWINGS

Various embodiments of a content management system for associating uploaded files with an ID are described below. In the course of this description, references will be made to the accompanying drawings, which are not necessarily drawn to scale, and wherein.

DETAILED DESCRIPTION

Figure 1:
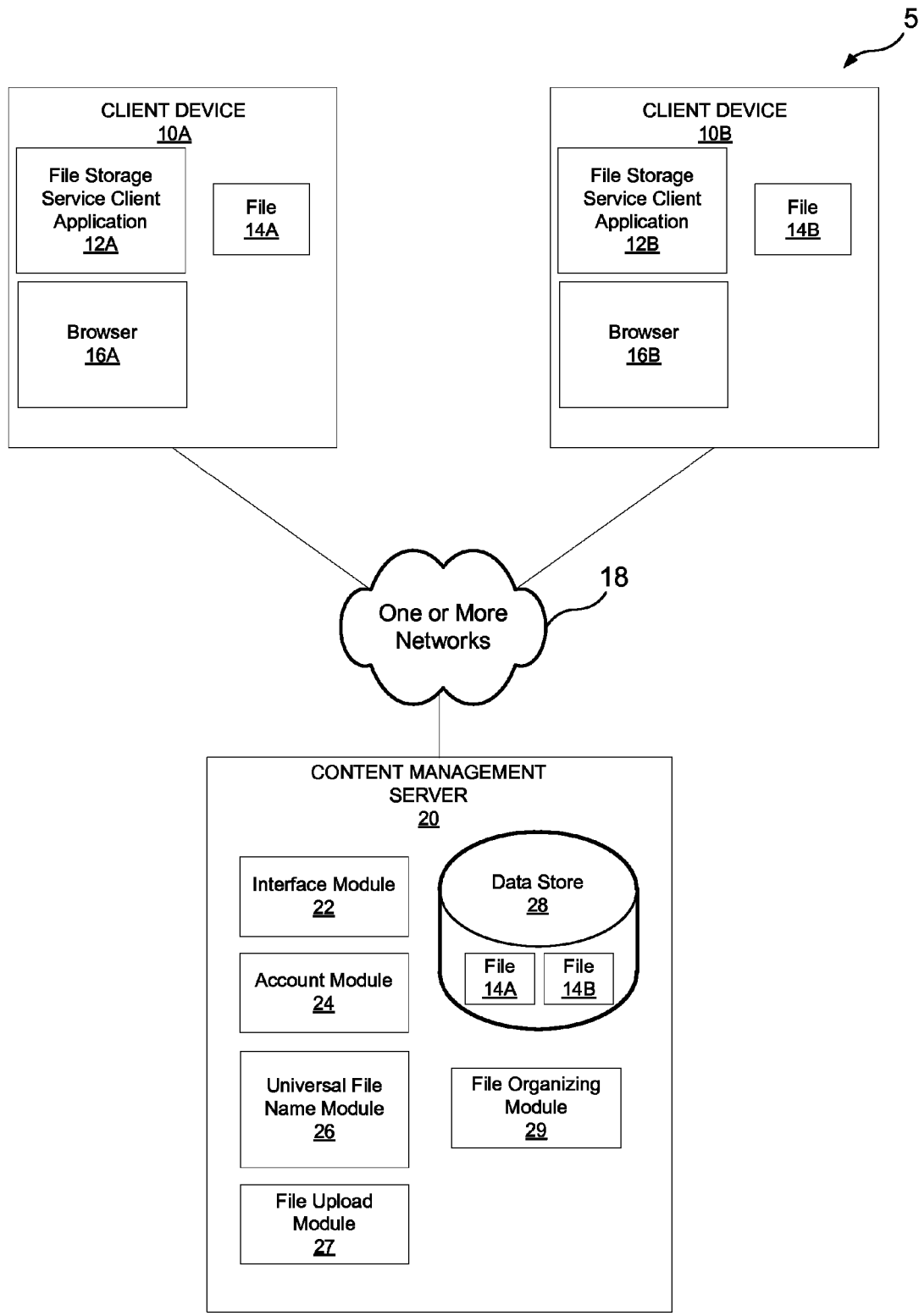
FIG. 1 shows a block diagram of a content management system in accordance with an embodiment of the present system.

Various embodiments will now be described. It should be understood that the present systems and methods may be embodied in many different forms and should not be construed as limited to the embodiments set forth herein. Like numbers refer to like elements throughout.

System Overview

A system, according to various embodiments, can include a content management server that automatically uploads files (e.g., photos) or other types of digital content from a client device (e.g., a desktop computer, a laptop computer, a mobile device, or other computing device) to a remote storage system. The system may arrange the uploaded files based on a unique identification code ("ID").

The ID may be calculated based on any data associated with a file. In various embodiments, the ID may be based on a file's creation time, which may be standardized by available time zone information. The present system can determine a time that each file was created based on file data. In various embodiments, the system may adjust the creation time by a time zone offset to account for the time zone in which the file was created. As a result, the ID provides a nomenclature that is based on the actual or estimated creation time of the file.

Typically, a system will order files by file name or by creation/modification time to reflect the chronological order the files were created/modified. For example, an imaging device such as a digital camera may name captured image files in accordance with a convention "IMGnnnn," where "nnnn" is the sequential number of the image as captured by the device. When files to be stored on a remote sharing storage system are created or modified by multiple devices or in different time zones, the system orders the files in a way that does not accurately portray the chronological order the files were created. In order to overcome these challenges, the system associates an ID with each file that is calculated based on the creation time for each file. The ID may be calculated by converting the creation time for each file to a Universal Time Code. Once an ID is associated with each file, the system can sort the files by using the ID for a better approximation of the actual chronological order, i.e., in a more meaningful way.

The creation time may be based on information associated with the file (e.g., a photo or other digital content), such as:

(1) information provided by the device that created or modified the file (for an image file, exchangeable image file data); (2) when the file was last modified in memory (file modification time data); (3) the raw date and time the file was created (file date-time data); (4) when the file was imported onto a client device; (5) extendable attributes containing data and time data; or (6) any other date and time information.

Once the creation time for a photo is determined, the system adjusts the creation time by an offset based on: (1) the actual time zone in which the file was created; or (2) the actual time zone in which the file was imported onto the client device. The result is a standardized creation time or ID. In other words, the system converts the time any file was created, regardless of the time zone or the format of the date, to a standardized Universal Time Code. The system may then use the Universal Time Code to create an ID that is associated with the file. Additionally, in various embodiments, the system may associate the ID with the file by renaming the file with the ID ("standardized name").

Next, the system checks for collisions (e.g., duplicate standardized names), which may occur if multiple files were created in the same second. An example using image files would be where multiple photos are taken in the same second. Here, the system may either: (1) use the file name assigned by the device used to take the image (if the images were taken on the same device); or (2) use the modification time data (in milliseconds) to determine which image was taken first in time. The system then adds a disambiguation modifier to the image file name to denote the proper time sequence of the files. For example, in some embodiments, the system will add a "–1" and a "–2" to two files created in the same second to denote which file was first in time. Finally, the system may associate the file with the ID and store the file for later use. In some embodiments, the system may rename the file with the ID.

Exemplary Technical Platforms

As will be appreciated by one skilled in the relevant field, the present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, smart mobile device, or other programmable data processing apparatus to produce a machine. As such, the instructions which execute on the general purpose computer, special purpose computer, smart mobile device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of content management system 5 according to a particular embodiment. Content management system 5 includes one or more client devices 10A or 10B (collectively "10"), such as a desktop computer, a mobile device (e.g., a laptop computer, a smart phone, a mobile computing device, or a handheld device) or another device capable of transferring files over network 18, that are in communication with content management server 20. Network 18, between content management server 20 and client devices 10, may be, for example, implemented via one or more wired or wireless networks such as LANs, WANs, a cellular network, a Wi-Fi network, or via the Internet. For purposes of ease of explanation and clarity, no specific cellular network is shown in FIG. 1 as a network for a mobile device. However, a cellular tower may be coupled to a cellular network provider, which may be operatively coupled to network 18.

In some embodiments, content management server 20 includes data storage 28, interface module 22, account module 24, file upload module 27, and file organizing module 29. Content management server 20 is connected to one or more client devices 10 via network 18. In various embodiments, content management server 20 may include one or more servers that are located in close physical proximity, or some servers may be locally together and others remote. In either case, all devices, wherever located, function as a system.

Interface module 22 facilitates file access and file storage between content management server 20 and client devices 10. Interface module 22 receives files from and sends files to client devices 10 consistent with the user's preferences for sharing files. Interface module 22 may act as the counterpart to a client-side file storage service client application 12A, 12B user interface that allows a user to manipulate files directly stored on content management server 20. In some embodiments, software operating on client devices 10 integrates network-stored files with the client's local file system to enable a user to manipulate network-stored files through the same user interface (UI) used to manipulate files on the local file system, e.g., via a file explorer, file finder, or browser application. As an alternative or supplement to the client-side file explorer interface, user interface module 22 may provide a web interface for client devices 10 to access (e.g. via browser 16) and allow a user to manipulate files stored on content management server 20. In this way, the user can directly manipulate files stored on content management server 20.

In various embodiments, data store 28 stores files such as those uploaded using client devices 10. It should be understood that, in various embodiments, data store 28 may include of multiple data stores—some local to, and some remote from, content management server 20. In the embodiment illustrated in FIG. 1, a first user associated with client 10A has certain files 14A associated with their account, and a second user associated with client 10B has certain files 14B associated with their account. Copies of these files are centrally stored in data store 28. Copies of each respective user's files may also be locally stored on multiple client devices 10 associated with the user's account. In various embodiments, each client device 10A and 10B may be used by the same user. In these embodiments, each client device 10 may have files stored on content management server 20 that are synced across the client devices. In other embodiments, the client devices may be used by different users.

Data store 28 maintains, for each user in a file journal, information identifying the user, information describing the user's file directory, etc. In some embodiments, the file journal is maintained on content management server 20. This file journal may be updated periodically using information obtained directly from content management server 20 and/or from information obtained from one or more client devices 10 linked to the user's account. In this way, the server-stored file journal (hereinafter the "server-side file journal") is updated when a file is changed either on the server or on one of the client devices associated with the user's account. When a file is changed, content management server 20 propagates the change to each client device associated with the user's account. For example, if a user makes a change to a particular file on a first client device, the change may be reflected in the server-side file journal. The system then uses the server-side file journal to propagate the change to all client devices associated with the user's account. Such techniques may be implemented, for example, within the context of a synchronized file system such as the Dropbox™ Service of Dropbox, Inc. of San Francisco, Calif.

Figure 2:
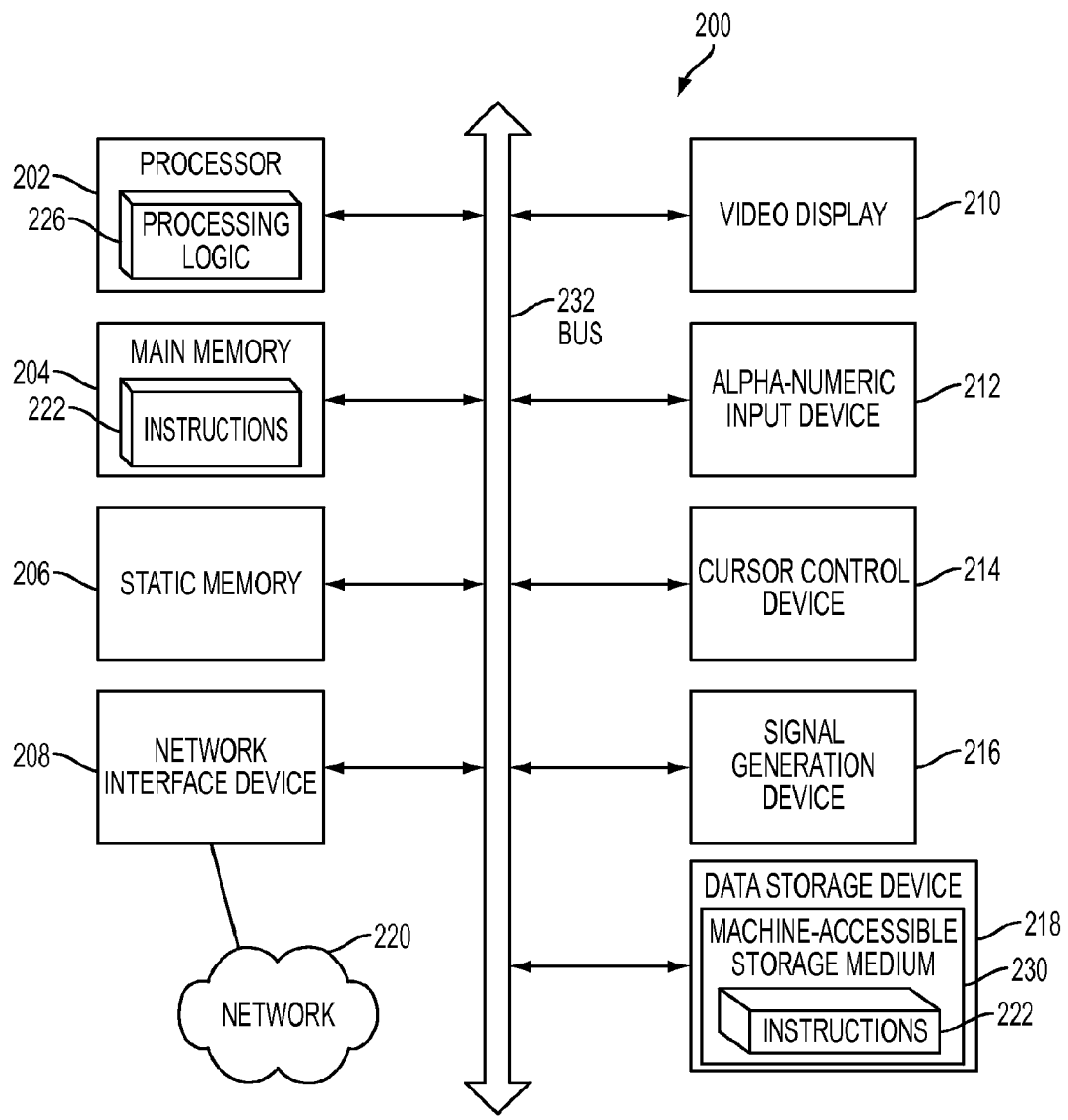
FIG. 2 shows a block diagram of a computer architecture that may be used, for example, to implement a synced content management server in accordance with various embodiments of the system in FIG. 1.

FIG. 2 illustrates a diagrammatic representation of a computer architecture 200 that can be used within content management system 5, for example, as an implementation of a client computer, or as content management server 20 (FIG. 1). For purposes of this disclosure, reference to a server or processor, shall be interpreted to include either a single server, a single processor, or multiple servers, or multiple processors.

In particular embodiments, computer 200 may be connected (e.g., networked) to other computers by a LAN, WAN, an intranet, an extranet, and/or the Internet. Computer 200 may operate in the capacity of a server or a client computer in a client-server network environment, or as a peer computer in a peer-to-peer (or distributed) network environment. Computer 200 may be a personal computer (PC), a tablet PC, a mobile device, a web appliance, a server, a network router, a switch or bridge, or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

Exemplary computer 200 may include processor 202, main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and data storage device 218, which communicate with each other via bus 232.

Processor 202 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), a network processor, or the like. Processor 202 may be configured to execute processing logic 226 for performing various operations and steps discussed herein.

Computer 200 may further include a network interface device 208. Computer 200 also may include video display 210 (e.g., a liquid crystal display (LCD) or a cathode ray tube (CRT)), alphanumeric input device 212 (e.g., a keyboard), cursor control device 214 (e.g., a mouse), and signal generation device 216 (e.g., a speaker).

Data storage device 218 may include machine accessible storage medium 230 (also known as a non-transitory computer-accessible storage medium, a non-transitory computer-readable storage medium, or a non-transitory computer-readable medium) on which is stored one or more sets of instructions (e.g., file organizing module 29, which is configured to carry out the steps illustrated in FIG. 3) embodying any one or more of the methodologies or functions described herein. File organizing module 29 may also reside, completely or at least partially, within main memory 204 and/or within processing device 202 during execution thereof by computer 200, main memory 204, and processing device 202 also constituting computer-accessible storage media. Instructions 222 (e.g., file organizing module 29) may further be transmitted or received over network 220 via network interface device 208.

While machine-accessible storage medium 230 is shown in an exemplary embodiment to be a single medium, the term "machine-accessible storage medium" should be understood to include a single medium or multiple media (e.g., a centralized or distributed database, and/or associated caches and servers) that store the one or more sets of instructions. The term "machine-accessible storage medium" shall also be understood to include any medium that is capable of storing, encoding, or carrying a set of instructions for execution by the computer and that cause the computer to perform any one or more of the methodologies of the present invention. The term "computer-accessible storage medium" shall accordingly be understood to include, but not be limited to, solid-state memories, optical, and magnetic media.

Exemplary System Operation

The systems and methods described herein apply equally to all types of files, and to files that are uploaded by multiple users to a shared folder in a synchronized content management system. For the purposes of clarity and brevity, the following discussion is directed to files uploaded by a single user to the user's account on a synchronized content management system. And, in particular, to image files that are uploaded from a client device to the content management system.

Figure 3:
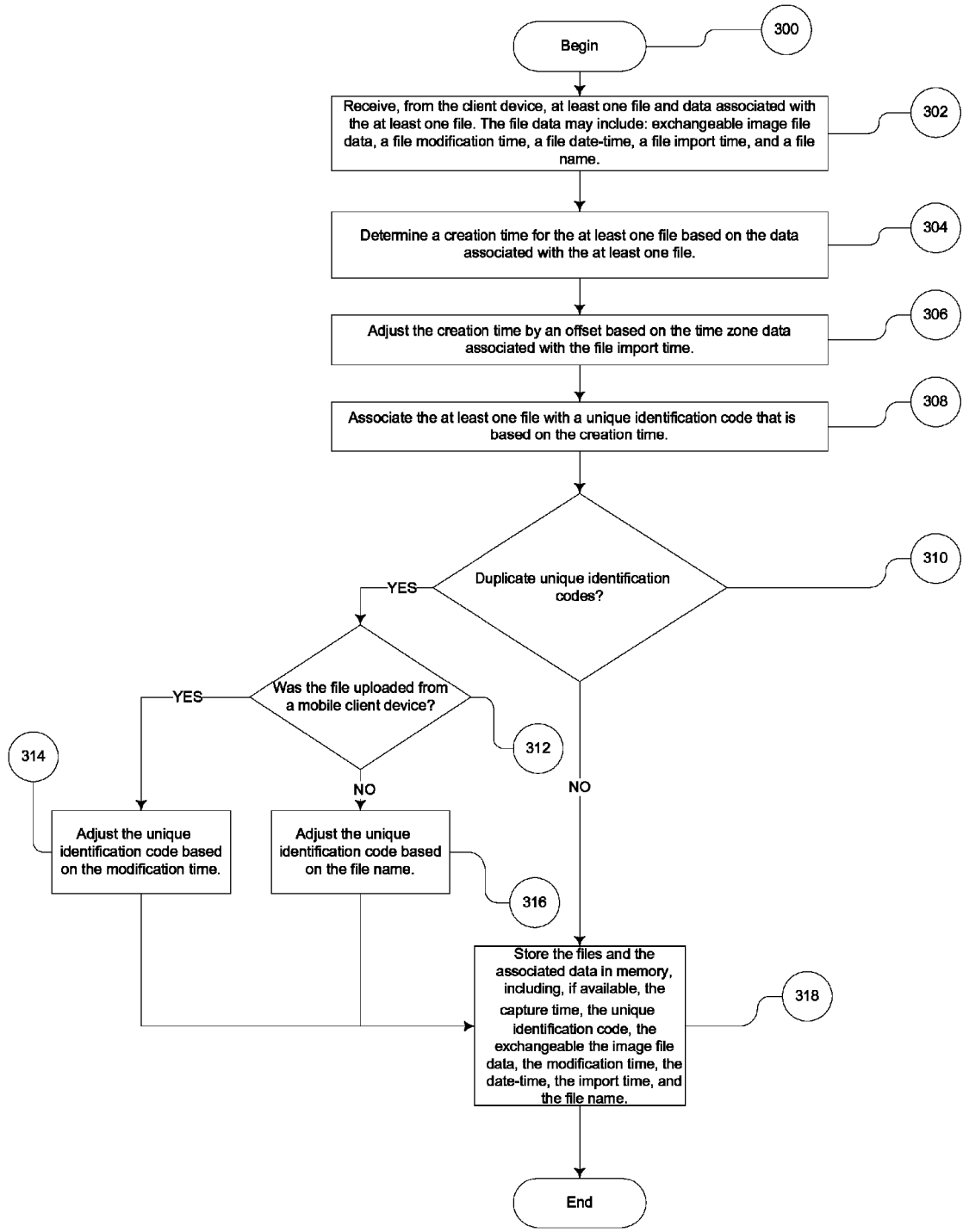
FIG. 3 shows a flow diagram that generally illustrates various steps executed by a synched content management server in accordance with one example embodiment of the system of FIG. 1.

FIG. 3 shows a method 300 carried out by the system of FIG. 1, in accordance with one exemplary embodiment, that is used to determine a creation time for a file and associate the file with an ID that is calculated based on the creation time of the file. It should be understood from reference to this disclosure, that in various embodiments, the ID may be determined based on various other factors such as: (1) information associated with users who have access to the file; (2) the type of file, (3) the creation time of the file, and/or (3) any other data associated with the file.

Beginning at step 302, the system receives, from client device 10, at least one file 14 and data associated with the file. The file data may include several different types of data. First, if the file is a digital photograph taken by a digital camera, the file data may include exchangeable image file data. Exchangeable image file data may include, for example, information about a digital photo including the time and date the "shutter" was activated, the shutter speed at which the photo was taken, and other relevant data associated with the photo (e.g., the make and model of the camera used to take the photo, etc.). It will be recognized by one with skill in the art that a digital camera may not have a physical "shutter." In certain embodiments, the exchangeable image file data may also include geographic data including a time zone in which the photo was taken. The date and time the shutter was activated may be expressed as the month, day, year, hour, minute, and second the photo was taken.

Second, the file data may include file modification data. In some embodiments, file modification data indicates the last time a file was modified. File modification data usually includes month, day, year, hour, minute, second, and millisecond time information. In various embodiments related to digital photography, the file modification data is typically the time and date the photo was captured by the device and stored in memory. File modification data is usually present if the device that created or modified the file is a mobile device such as a cell phone.

Third, the file data may include file date-time information, which may be, for example, a raw date and a raw time that the file was created by the device (e.g., the raw date and raw time that an image was captured by a camera). In some embodiments, the file date-time may be the time and date when a file was initially stored on the SD card of a device. The file date-time is usually expressed as month, day, year, hour, minute, and second information.

Fourth, the file data may include a file import time. In certain embodiments, the file import time is the time when the file was imported from the file creating device to a client device. For example, the file import time may be the time and date when an image file was uploaded from a digital camera to a desktop computer client device. In other embodiments where the client device is the same device that created the file, the file import time is the date and time that the file is scanned by a software program on the client device to upload the file to the remote content management server. For example, a mobile device may be used to capture an image. If the mobile device is also a client device, the file import time is the time when the client device determines that the new image is available to be uploaded to the content management server. Typically, the file import time will include month, day, year, hour, minute, second, and time zone information.

In various embodiments, the file data also includes a file name that is usually assigned by the device on which the file was created. For example, in the case of an image file, an iPhone® may label each image file with the prefix "IMG-", while a digital camera manufactured by Canon, Inc. may label each image file with the prefix "DSC." The assigned image file name usually includes the standard prefix appended to a sequential image number. In other embodiments, the user may change the file name when the user uploads files from a device to a desktop computer client device or at any other suitable time.

At step 304, the system determines an estimated time at which the file was created. It should be understood by reference to this disclosure that, in various embodiments, the time at which a file was created may also reference the last time a file was modified, saved, or, in the case of an image file, captured. In various embodiments, the system determines an estimated time a file was created based on the data associated with the file.

For example, image files may contain different types of data, depending on the type of device that captured the image. In various embodiments, the system determines the image creation time based on the exchangeable image file data. If unavailable, the system may determine the capture time based on data associated with the file in the following order of preference: (1) the date and time information from the file modification data; (2) the file date-time information; and (3) the file import time information. After determining the time the image was captured, the system standardizes the format of the capture date and time information. In various embodiments, the system may format the capture date and time as a two-digit month and day, followed by a four digit year, then a two digit hour, minute, and second (e.g., MM.DD.YYYY.HH.mm.ss.EXT). In other embodiments, the system may format the capture date and time as YYYY.DD.MM.HH.mm.ss.EXT. It should be understood from reference to this disclosure that the standardized format may be any ordering of the month, day, year, hour, minute and second information that is suitable to the configuration of the system.

At step 306, the system adjusts the creation time by an offset to account for a time zone in which the file was created or imported. In some embodiments, the adjusted creation time may be used as the ID. In the case of an image file, for example, a system may receive an image that was taken in Berlin, Germany on a digital camera at 18:55:45 CET (local time). In this example, the system will standardize the image creation time by converting the image creation time to a Universal Time Code that is agnostic of the time zone in which the image was taken. Thus, in the current example, the system will convert the image capture time (18:55:45 CET) to the equivalent Universal Time Code (i.e., 5:55:45 UTC). The time zone offset may either be determined from (1) the time zone information in the exchangeable image file data; or (2) the time zone associated with the image file import time. Typically, time zone information may be included in the exchangeable image file data when a camera is GPS enabled. However, this information may currently only be available with newer cameras. Thus, the time zone information associated with the image file import may provide a best estimate of the time zone in which the image was captured when no other time zone information is available.

At step 308, the system associates the ID with the file. In some embodiments, the ID for each file may be used as a standardized name for the respective file (e.g., the system renames the file with the standardized name). In other embodiments, the system may associate the ID with the file by rewriting only a portion of the file's metadata or extendable data. Use of a standardized name allows files (e.g., photos) created, uploaded, or modified from various devices to be stored in a common location (e.g., a synchronized content management server) using a standardized naming nomenclature. In various embodiments, the result is that no two files (e.g., photos) have the same file name regardless of the device used to create the file or the time zone in which the file was imported. Moreover, in the case image files where the ID is used to rename the image file, the image files may be ordered in a more meaningful way (such as in absolute chronological order) based on the new file name.

At step 310, the system checks to see if there are any duplicate IDs for files uploaded to the same account on the content management server. Because the creation time is calculated to the second, duplicate IDs may be present if two files were created on the same device during the same second. For example, for image files, two photos may be taken in the same second on any device capable of taking multiple pictures within a single second.

If duplicate IDs result, then the system, at step 312, determines if the duplicate files were created using a mobile device. Files created on a mobile device typically have associated file modification time data, which is calculated to the millisecond. At step 314, if the files were created using a mobile device, the system disambiguates the duplicate IDs by adding a modifier, designating the order in which the files were created. For example, the system may add a "−1," "−2," or "−3", etc. to the end of each of the duplicate IDs to indicate the proper sequence of the files. If the duplicate files were not created using a mobile device, then, at step 316, the system disambiguates the duplicate IDs based on the file name assigned to each file by the device used to create the file (e.g., by adding "−1," "−2," etc. to the end of the IDs). Generally, devices automatically name files in the order in which they are created. Therefore, the system can use the file names to determine which file was created first in time.

Once the system determines there are no duplicate IDs or has adjusted duplicate IDs, at step 318, the system stores the files and associated data in memory. The system may also store, if available, the creation time, the standardized name, the exchangeable image file data, the modification time, the date-time data, the import time data, and, if the file was renamed using the standardized name, the original file name for each of the uploaded files. In some embodiments where the system renames the files using the standardized name, the system may display the files based on the standardized names. In other embodiments, the system may organize the files based on the associated ID.

Examples

The following examples are provided to further enhance understanding of the present systems and methods. It should be understood that the present systems and methods may be embodied in many different forms and the following examples should not be construed as limited to the embodiments set forth herein. Rather, these embodiments are provided so that this disclosure will be thorough and complete, and will fully convey the scope of the present system and method to those skilled in the art.

In a particular example, a user has two devices capable of taking digital photos: (1) an iPhone®, which has a digital camera and is capable of connecting to the internet through a network; and (2) a Canon, Inc. digital camera, which is not capable of connecting to the internet. The user travels to Munich, Germany on Jun. 1, 2012 (CET time zone); Rio de Janeiro, Brazil on Sep. 1, 2012 (BRT time zone), and San Francisco, USA on Nov. 1, 2012 (PDT time zone). The user takes two pictures on both devices in each location. The photos taken by the Canon® are labeled with a "DSC-" prefix, and each photo contains exchangeable image file data which includes the date and the time the shutter was activated. This data is expressed as the month, day, year, hour, minute, and second the photo was taken. The files also have the file date-time information from when the file was first stored in memory expressed as the month, day, year, hour, minute, and second.

The iPhone® pictures have exchangeable image file data, modification time data (only for cell phones with cameras and determined to the millisecond), and file-date time information. At each location, the user imports the files from each device to a desktop computer, which then uploads the files to a remote server when connected to the internet. For simplicity in this example, the photos are taken and imported on the same day to the desktop computer. However, in other examples, they may not be uploaded to the remote server until a later date. Additionally, when the photos are imported to the desktop computer, each photo from each device is given an associated import time with a time zone (e.g., the time each file was imported to the desktop computer).

The pictures taken in Germany are labeled DSC-1 and IMG-1. The photos are then imported to the desktop computer, which uploads them to the server. DSC-1 is uploaded to the server with the following associated data:

(1) exchangeable image file data: Jun. 1, 2012, 6:00:00 PM;

(2) file date-time information: Jun. 1, 2012, 6:00:01 PM; and (3) file import time: Jun. 1, 2012, 7:15:00 PM CET.

IMG-1 is uploaded to the server with the following associated data:

(1) exchangeable image file data: Jun. 1, 2012, 6:30:00 PM;

(2) modification time data: Jun. 1, 2012, 6:30:00:46 PM;

(3) file date-time information: Jun. 1, 2012, 6:30:01 PM; and (4) file import time: Jun. 1, 2012, 7:17:00 PM CET.

The Canon® erases photos when imported to the desktop computer to save storage space, but the iPhone® does not. Therefore, naming for the Canon® begins again at DSC-1 and the iPhone continues to label photos sequentially. Currently on the remote server are photos DSC-1 and IMG-1.

The photos taken in Brazil are labeled DSC-1 & IMG-2. The photos are then imported to the desktop computer, but the remote server is unavailable. DSC-1 is uploaded to the desktop computer with the following associated data:

(1) exchangeable image file data: Sep. 1, 2012, 5:30:00 PM;

(2) file date-time information: Sep. 1, 2012, 5:00:01 PM; and (3) file import time: Sep. 1, 2012, 5:15:00 PM BRT.

IMG-2 is uploaded to the desktop computer with the following associated data:

(1) exchangeable image file data: Sep. 1, 2012, 5:00:00 PM;

(2) modification time data: Sep. 1, 2012, 6:30:00:46 PM;

(3) file date-time information: Sep. 1, 2012, 6:30:01 PM; and (4) file import time: Sep. 1, 2012, 7:17:00 PM BRT.

The desktop computer is now storing DSC-1, DSC-1(1), IMG-1, and IMG 2. The remote server is currently storing DSC-1 and IMG-1.

The photos taken in San Francisco are labeled DSC-1 & IMG-3. The photos are then imported to the desktop computer. DSC-1 is imported to the desktop computer with the following associated data:

(1) exchangeable image file data: Nov. 1, 2012, 4:00:00 PM;

(2) file date-time information: Nov. 1, 2012, 4:00:01 PM; and (3) file import time: Nov. 1, 2012, 4:15:00 PM PDT.

IMG-3 is uploaded to the desktop computer with the following associated data:

(1) exchangeable image file data: Nov. 1, 2012, 4:30:00 PM;

(2) modification time data: Nov. 1, 2012, 4:30:00:46 PM;

(3) file date-time information: Nov. 1, 2012, 6:30:01 PM; and (4) file import time: Sep. 1, 2012, 7:17:00 PM PDT.

The desktop computer is now connected the internet and the files from Brazil and San Francisco are uploaded to the remote server. The photos on the remote server are: DSC-1, DSC-1(1), DSC-1(2), IMG-1, IMG-2, and IMG-3. The remote server stores and orders the files by their file names so they are displayed as follows:

DSC-1 (Germany—1);

DSC-1(1) (Brazil—2);

DSC-1(2) (San Francisco—1),

IMG-1 (Germany—2);

IMG-2 (Brazil—1); and

IMG-3 (San Francisco—2).

Thus, as the user views these photos on the remote server, the images are not chronologically ordered.

Under the present systems and methods described herein, the remote server renames each of the uploaded files with a standardized name that is based on a normalized capture time (e.g., the Universal Time Code time at which the photo was captured or imported). Therefore, when a photo is uploaded, the remote server determines the time the photo was captured based on the information associated with the photo and applies a time zone offset that is determined based on either the actual time zone in which the photo was captured or an estimated time zone from when the photo was imported. In the current example, since no geographical information is associated with any of the photos, the system defaults to the time zone associated with the import time.

Using the above information, the remote server will determine the capture time and adjust the capture time by the estimated time zone offset, which results in the standardized time as follows:

| Image Name | Location | Capture Time | Import Time Zone | Time Zone Adj. | Standardized Time | Standardized Name |
|---|---|---|---|---|---|---|
| DSC-1 | Munich, Germany | Jun. 1, 2012, 1800 CET | CET | −1.00 | Jun. 1, 2012, 1700 UTC | 06.01.2012.17.00.00 |
| DSC-1(1) | Rio de Janeiro, Brazil | Sep. 1, 2012, 1730 BRT | BRT | −3.00 | Sep. 1, 2012, 1430 UTC | 09.01.2012.14.30.00 |
| DSC-1(2) | San Francisco, USA | Nov. 1, 2012, 1600 PDT | PDT | −7.00 | Nov. 1, 2012, 900 UTC | 11.01.2012.09.00.00 |
| IMG-1 | Munich, Germany | Jun. 1, 2012, 1830 CET | CET | −1.00 | Jun. 1, 2012, 1730 UTC | 06.01.2012.17.30.00 |
| IMG-2 | Rio de Janeiro, Brazil | Sep. 1, 2012, 1700 BRT | BRT | −3.00 | Sep. 1, 2012, 1400 UTC | 09.01.2012.14.00.00 |
| IMG-3 | San Francisco, USA | Nov. 1, 2012, 1630 PDT | PDT | −7.00 | Nov. 1, 2012, 930 UTC | 11.01.2012.09.30.00 |

Once the above conversion is completed, the system renames each image file with its respective standardized name from the above table. Now, when the user views the uploaded files, the images will be ordered as follows:

06.01.2012.17.00.00.jpg (German—1)
06.01.2012.17.30.00.jpg (German—2)
09.01.2012.14.00.00.jpg (Brazil—1)
09.01.2012.14.00.00.jpg (Brazil—2)
11.01.2012.09.00.00.jpg (San Francisco—1)
11.01.2012.09.30.00.jpg (San Francisco—2)

As can be seen from the above example, the present systems and methods may allow a user to take photos in any location, at any time, with any suitable device, and once uploaded, the system renames the image files so that they can be presented to the user in chronologically order.

Conclusion

Having the benefit of the teachings presented in the foregoing descriptions and associated drawings, one of skill in the art will recognize many modifications and other embodiments of the invention. In light of the above, it is to be understood that the invention is not to be limited to the specific embodiments disclosed and that modifications and other embodiments are intended to be included within the scope of the appended claims. While various examples herein are described above as being applied to files and folders, it should be understood that the same or similar techniques may be applied to types of digital content other than files or folders, such as a post on a social media web site that are not stored in the form of a file, progress made in a video game where the progress is not saved as part of a file, or the appearance of an avatar that is not stored in the form of a file. Moreover, although many of the examples described above are in the context of renaming image files based on the time that the image was captured, the same or similar techniques may be used to rename files of other types of digital content (e.g., document files, music files, video files, and .pdf files). Although specific terms are employed herein, they are used in a generic and descriptive sense only and not for the purposes of limitation.

What is claimed:

1. A computer-implemented method comprising:
   receiving by a content management system, from a client device, a plurality of files, each file having respective associated data including a file name;
   creating by the content management system, a standardized name for each file based on a creation time for the corresponding file;
   determining by the content management system, that more than one of the received plurality of files have duplicate standardized names; and
   adding by the content management system, a modifier to each standardized name for the duplicate standardized names, wherein each modifier is based on the associated data of the file for which it modifies.

2. The computer-implemented method of claim 1 further comprising converting the creation time to a base time zone by a time zone offset.

3. The computer-implemented method of claim 1 wherein each file comprises an image and the creation time is a capture time of the image.

4. The computer-implemented method of claim 3 wherein the respective associated data further comprises at least one of:
   exchangeable image file data that comprises a date and a time that the image was captured;
   a file modification time that indicates a date and a time that the at least one file was stored in memory of the device that captured the image;
   a file date-time that indicates a raw date and a raw time that the at least one file was created; or
   a file import time that indicates when the at least one file was imported to the client device.

5. The computer-implemented method of claim 4 further comprising converting the capture time to a base time zone based on the time zone data associated with the file import time.

6. The computer-implemented method of claim 4 further comprising creating a standardized format for the capture time.

7. The computer-implemented method of claim 6 wherein the standardized format of the capture time is expressed as a two digit month, a two digit day, a four digit year, a two digit hour, a two digit minute, and a two digit second.

8. The computer-implemented method of claim 4 wherein the exchangeable image file data further comprises geographic data including a time zone.

9. The computer-implemented method of claim 8 further comprising converting the capture time to a base time zone by an offset based on the time zone associated with the geographic data.

10. The computer-implemented method of claim 4 wherein the client device is a handheld device having a camera.

11. The computer-implemented method of claim 1, wherein the content management system comprises a synchronized content and sharing system.

12. The computer-implemented method of claim 1 wherein the respective associated data further contains file modification data that is expressed in milliseconds.

13. A computer-implemented method comprising:
  receiving at a content management system, from a client device, a plurality of image files and data associated with each of the plurality of image files wherein the data comprises:
    a file name, assigned by the client device that captured the image for each of the plurality of image files; and
    a capture time;
  renaming each of the plurality of image files with a standardized name that is based on the capture time of the image file;
  determining that more than one of the received plurality of files have duplicate standardized names; and
  adding a modifier to each standardized name for the duplicated standardized names, wherein each modifier is based on associated data of the file for which it modifies.

14. The computer-implemented method of claim 13 further comprising organizing the plurality of image files based on the standardized name.

15. The computer-implemented method of claim 13 further comprising adjusting the capture time based on a time zone.

16. The computer-implemented method of claim 13, further comprising storing each of the plurality of image files and the data associated with each of the plurality of image files, wherein the data comprises the standardized name.

17. A system comprising:
  at least one processor;
  memory operatively coupled to the at least one processor, with the at least one processor configured to:
    receive, from a client device, a plurality of files, each file having respective associated data including a file name and a creation time;
    create a standardized name for each file based on the creation time for the corresponding file;
    determine that more than one of the received plurality of files have duplicate standardized names; and
    add a modifier to each standardized name for the duplicate standardized names, wherein each modifier is based on the associated data of the file for which it modifies.

18. The system of claim 17 wherein the plurality of digital content is a plurality of image files.

19. The system of claim 18 wherein the at least one processor is further configured to organize the plurality of image files based on the standardized name for each of the plurality of image files.

20. The system of claim 17 wherein the at least one processor is further configured to store in the memory each of the plurality of files and the data associated with each of the plurality of files, wherein the data comprises a unique identification code.

* * * * *